United States Patent
Kim et al.

(10) Patent No.: US 8,913,798 B2
(45) Date of Patent: Dec. 16, 2014

(54) SYSTEM FOR RECOGNIZING DISGUISED FACE USING GABOR FEATURE AND SVM CLASSIFIER AND METHOD THEREOF

(75) Inventors: Kye Kyung Kim, Daegu (KR); Jae Yeon Lee, Daejeon (KR); Ho Sub Yoon, Daejeon (KR); Jae Hong Kim, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 175 days.

(21) Appl. No.: 13/565,022

(22) Filed: Aug. 2, 2012

(65) Prior Publication Data

US 2013/0163829 A1    Jun. 27, 2013

(30) Foreign Application Priority Data

Dec. 21, 2011    (KR) .................. 10-2011-0139605

(51) Int. Cl.
   *G06K 9/00* (2006.01)
(52) U.S. Cl.
   CPC ........................... *G06K 9/00* (2013.01)
   USPC ........... 382/118; 382/103; 382/159; 382/190; 382/224; 382/264; 382/279
(58) Field of Classification Search
   CPC .......... G06K 9/00268; G06K 9/00302; G06K 9/00221; G06K 9/00597; G06K 9/00335; G06K 9/6256; G06K 9/626; G06K 9/6292; G06F 21/10; G06F 17/18; A61B 5/7267
   USPC .......................... 382/118, 159, 224, 264, 279
   See application file for complete search history.

(56) References Cited

U.S. PATENT DOCUMENTS

| | | | | |
|---|---|---|---|---|
| 6,707,933 | B1 * | 3/2004 | Mariani et al. | 382/118 |
| 7,099,505 | B2 * | 8/2006 | Li et al. | 382/159 |
| 7,274,822 | B2 * | 9/2007 | Zhang et al. | 382/224 |
| 7,430,315 | B2 * | 9/2008 | Yang et al. | 382/159 |
| 7,492,943 | B2 * | 2/2009 | Li et al. | 382/159 |
| 7,519,200 | B2 * | 4/2009 | Gokturk et al. | 382/118 |
| 7,532,743 | B2 * | 5/2009 | Morisada | 382/103 |
| 7,606,790 | B2 * | 10/2009 | Levy | 1/1 |
| 7,899,253 | B2 * | 3/2011 | Porikli et al. | 382/190 |
| 2003/0128877 | A1 * | 7/2003 | Nicponski | 382/224 |
| 2004/0022442 | A1 * | 2/2004 | Kim | 382/225 |
| 2004/0264780 | A1 * | 12/2004 | Zhang et al. | 382/224 |
| 2005/0013479 | A1 * | 1/2005 | Xiao et al. | 382/159 |
| 2005/0147303 | A1 * | 7/2005 | Zhou et al. | 382/190 |
| 2005/0180627 | A1 | 8/2005 | Yang et al. | |
| 2006/0029276 | A1 * | 2/2006 | Nagahashi et al. | 382/173 |

(Continued)

*Primary Examiner* — Vikkram Bali
*Assistant Examiner* — Aklilu K. Woldemariam
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed are a system and a method for recognizing a disguised face using a Gabor feature and a support vector machine (SVM) classifier according to the present invention. The system for recognizing a disguised face includes: a graph generation means to generate a single standard face graph from a plurality of facial image samples; a support vector machine (SVM) learning means to determine an optimal classification plane for discriminating a disguised face from the plurality of facial image samples and disguised facial image samples; and a facial recognition means to determine whether an input facial image is disguised using the standard face graph and the optimal classification plane when the facial image to be recognized is input.

16 Claims, 6 Drawing Sheets

(56) References Cited

U.S. PATENT DOCUMENTS

| | | |
|---|---|---|
| 2006/0093208 A1* | 5/2006 | Li et al. ............... 382/159 |
| 2006/0115157 A1* | 6/2006 | Mori et al. ............ 382/190 |
| 2008/0016016 A1* | 1/2008 | Mitarai et al. ......... 706/25 |
| 2008/0107311 A1* | 5/2008 | Huang et al. .......... 382/118 |
| 2008/0107341 A1* | 5/2008 | Lu ........................ 382/190 |
| 2008/0260212 A1* | 10/2008 | Moskal et al. ........ 382/118 |
| 2009/0060290 A1* | 3/2009 | Sabe et al. ............ 382/118 |
| 2010/0232657 A1* | 9/2010 | Wang .................... 382/118 |

* cited by examiner

N FACIAL IMAGE SAMPLES             STANDARD FACE GRAPH

200

SYSTEM FOR RECOGNIZING DISGUISED FACE USING GABOR FEATURE AND SVM CLASSIFIER AND METHOD THEREOF

CROSS-REFERENCE TO RELATED APPLICATIONS

This application claims priority to and the benefit of Korean Patent Application No. 10-2011-0139605 filed in the Korean Intellectual Property Office on Dec. 21, 2011, the entire contents of which are incorporated herein by reference.

TECHNICAL FIELD

The present invention relates to a facial recognition technology, and more particularly, to a system and a method for recognizing a disguised face using a Gabor feature and a support vector machine (SVM) classifier that may estimate a position of a facial feature point from a facial area, extract a Gabor feature from the estimated facial feature point, and recognize a face by employing the extracted Gabor feature as an input vector of the SVM classifier.

BACKGROUND ART

Currently, a facial recognition technology has been considered as a marketable recognition technology in the biometrics field due to the convenience in that there is no need to seek for a user's permission, which is different from a fingerprint recognition technology or an iris scan technology, and the applicability into various application fields. In particular, the facial recognition technology has been employed for a security system that authenticates an individual user or allows incoming and outgoing to thereby be used for incoming and outgoing management for each section and each time and recording of a travel path. The facial recognition technology has been applied as a security technology for preventing crimes and tracking down criminals. The facial recognition technology has been used to recognize a person who disguises the person's appearance by wearing a mask, sunglasses, and the like when the person accesses another user's account or directory to thereby illegally access a file or to attempt a financial criminal activity by forging the person's identity in a computer system.

Existing researches on detecting a disguised face with a mask or sunglasses determines the disguise depending on whether a facial detection succeeds or fails using a facial detection method about a normal face that is not disguised. Accordingly, even though the normal face is not properly detected, the normal face may be determined to be the disguised face. A face of a person who wears a mask or sunglasses does not have a normal facial feature and thus, it is very difficult to detect a disguised face by applying an existing facial detection and recognition method.

As an existing facial detection method, researches on detecting a facial outline or eyes and lips detecting a facial area using an oval template based on special edge information around a face or based on color information have been conducted. Proposed is a method capable of detecting a facial outline using a facial shape modeling based active shape model (ASM) matching scheme. As representative facial recognition methods, there are principle component analysis (PCA), elastic bunch graph matching, linear discriminant analysis (LDA), local feature analysis (LFA), and the like.

However, in the above methods, various facial shapes, a change in illumination, distortion of an input image, a change in posture, and the like may cause a facial area extraction error or may degrade the recognition performance. Therefore, there is a need for researches on a facial detection method and recognition method robust against the above-mentioned change factors.

Researches on a method of detecting and recognizing a disguised facial area have been conducted. However, in a disguised face, facial feature points such as eyes, a nose, lips, and the like are occluded by sunglasses or a mask and thus, it is difficult to detect a facial area with a facial detection method using a normal facial feature. Even though a method of detecting a face by modeling a facial shape is proposed, there was an obvious difference in the recognition performance or processing time based on an initial matching position of a facial model. In the case of the disguised face, due to a partially occluded facial area and a variety of disguised facial shapes, it is very difficult to recognize the disguised face, adaptable to an actual environment, using the proposed facial detection method and recognition algorithm.

Accordingly, there is a need for development of an algorithm that may accurately detect a facial area and determine whether a facial image is disguised using the detection result even though a portion of the facial area is occluded with sunglasses or a mask.

SUMMARY OF THE INVENTION

The present invention has been made in an effort to provide a system and a method for recognizing a disguised face using a Gabor feature and a support vector machine (SVM) classifier that may estimate a position of a facial feature point from a facial area, extract a Gabor feature from the estimated facial feature point, and recognize a face by employing the extracted Gabor feature as an input vector of the SVM classifier.

However, objects of the present invention are not limited thereto and thus, other objects not described herein may be clearly understood by those skilled in the art from the following description.

An exemplary embodiment of the present invention provides a system for recognizing a disguised face, the system including: a graph generation means to generate a single standard face graph from a plurality of facial image samples; an SVM learning means to determine an optimal classification plane for discriminating a disguised face from the plurality of facial image samples and disguised facial image samples; and a facial recognition means to determine whether an input facial image is disguised using the standard face graph and the optimal classification plane, when the facial image to be recognized is input.

The graph generation means may detect a rectangular facial area with a predetermined size from each of the input facial image samples using an Adaboost algorithm, normalize each of the detected rectangular facial areas to a predetermined size, extract a facial feature point from each of the normalized rectangular facial areas, and generate the standard face graph using the extracted facial feature points.

The size of the normalized rectangular facial area may be set to be greater than or equal to a size of the detected rectangular facial area.

The SVM learning means may detect a rectangular facial area from each of the input facial image samples and the disguised facial image samples using an Adaboost algorithm, normalize each of the detected rectangular facial areas to a predetermined size, generate an optimal face graph using the normalized rectangular facial areas, extract a Gabor feature value from the generated optimal face graph, and determine the optimal classification plane for discriminating the disguised face using the extracted Gabor feature value of the optimal face graph and a position value.

The SVM learning means may generate an initial face graph by adjusting a size of the standard face graph based on position points of two eyes within the rectangular facial area, and generate the optimal face graph by comparing a similarity between a Gabor feature value at each node of the initial face graph and a standard Gabor feature value at each node of the standard face graph and repeatedly modifying the initial face graph using a particle swarm optimization (PSO) algorithm based on the comparison result.

The facial recognition means may detect a rectangular facial area from the input facial image using an Adaboost algorithm, normalize the detected rectangular facial area to a predetermined size, generate an optimal face graph using the normalized rectangular facial area, and determine whether the input facial image is disguised using a Gabor feature value and a position value that are extracted from the generated optimal face graph, and the pre-generated optimal classification plane.

The facial recognition means may generate the optimal face graph using the normalized rectangular facial area, extract the Gabor feature value and the position value from the generated optimal face graph, and provide the extracted Gabor feature value and position value of each of nodes of the optimal face graph as an input value of an SVM classifier and as a result, obtain an output value of the SVM classifier, and determine whether the input facial image is disguised using the output value and the generated optimal classification plane.

Another exemplary embodiment of the present invention provides a system for recognizing a disguised face, the system including: a detector to detect a rectangular facial area from an input facial image using an Adaboost algorithm; a normalization unit to normalize the detected rectangular facial area to a predetermined size; an extractor to generate an optimal face graph using the normalized rectangular facial area, and to extract a Gabor feature value and a position value from the generated optimal face graph; and a determining unit to determine whether the input facial image is disguised using the extracted Gabor feature value and position value, and a pre-generated optimal classification plane for recognizing a disguised face.

The determining unit may provide the extracted Gabor feature value and position value of each of nodes of the optimal face graph as an input value of an SVM classifier and as a result, obtain an output value of the SVM classifier, and determine whether the input facial image is disguised using the output value and the optimal classification plane.

Yet another exemplary embodiment of the present invention provides a method of recognizing a disguised face, the method including: generating a single standard face graph from a plurality of facial image samples; generating an optimal classification plane for recognizing a disguised face from the plurality of facial image samples and disguised facial image samples; and determining whether an input facial image is disguised using the standard face graph and the optimal classification plane, when the facial image to be recognized is input.

The generating of the standard face graph may detect a rectangular facial area with a predetermined size from each of the input facial image samples using an Adaboost algorithm, normalize each of the detected rectangular facial areas to a predetermined size, extract a facial feature point from each of the normalized rectangular facial areas, and generate the standard face graph using the extracted facial feature points.

The size of the normalized rectangular facial area may be set to be greater than or equal to a size of the detected rectangular facial area.

The generating of the optimal classification plane may detect a rectangular facial area from each of the input facial image samples and the disguised facial image samples using an Adaboost algorithm, normalize each of the detected rectangular facial areas to a predetermined size, generate an optimal face graph using the normalized rectangular facial areas, extract a Gabor feature value from the generated optimal face graph, and generate the optimal classification plane for discriminating the disguised face using the extracted Gabor feature value of the optimal face graph and a position value.

The generating of the optimal classification plane may generate an initial face graph by adjusting a size of the standard face graph based on position points of two eyes within the rectangular facial area and generate the optimal face graph by comparing a similarity between a Gabor feature value at each node of the initial face graph and a standard Gabor feature value at each node of the standard face graph and repeatedly modifying the initial face graph using a PSO algorithm based on the comparison result.

The determining of whether the input facial image is disguised may detect a rectangular facial area from the input facial image using an Adaboost algorithm, normalize the detected rectangular facial area to a predetermined size, generates an optimal face graph using the normalized rectangular facial area, and determine whether the input facial image is disguised using a Gabor feature value and a position value that are extracted from the generated optimal face graph, and the generated optimal classification plane.

The determining of whether the input facial image is disguised may generate the optimal face graph using the normalized rectangular facial area, extract the Gabor feature value and the position value from the generated optimal face graph, and provide the extracted Gabor feature value and position value of each of nodes of the optimal face graph as an input value of an SVM classifier and as a result, obtain an output value of the SVM classifier, and determine whether the input facial image is disguised using the output value and the generated optimal classification plane.

Still another exemplary embodiment of the present invention provides a method of recognizing a disguised face, the method including: detecting a rectangular facial area from an input facial image using an Adaboost algorithm; normalizing the detected rectangular facial area to a predetermined size; generating an optimal face graph using the normalized rectangular facial area, and extracting a Gabor feature value and a position value from the generated optimal face graph; and determining whether the input facial image is disguised using the extracted Gabor feature value and position value, and a pre-generated optimal classification plane for recognizing a disguised face.

The determining of whether the input facial image is disguised may provide the extracted Gabor feature value and position value of each of nodes of the optimal face graph as an input value of an SVM classifier and as a result, obtain an output value of the SVM classifier, and determine whether the input facial image is disguised using the output value and the optimal classification plane.

According to exemplary embodiments of the present invention, by estimating a position of a facial feature point from a facial area, extracting a Gabor feature from the estimated facial feature point, and recognizing a face using the extracted Gabor feature as an input vector of the SVM classifier, it is possible to efficiently recognize a face even with the peripheral illumination affect or various facial patterns.

According to exemplary embodiments of the present invention, it is possible to efficiently recognize a face even with the peripheral illumination affect or various facial patterns. Therefore, it is possible to improve the accuracy of facial recognition.

According to exemplary embodiments of the present invention, it is possible to efficiently recognize a face even with the peripheral illumination affect or various facial patterns. Therefore, it is possible to improve the reliability about the facial recognition.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
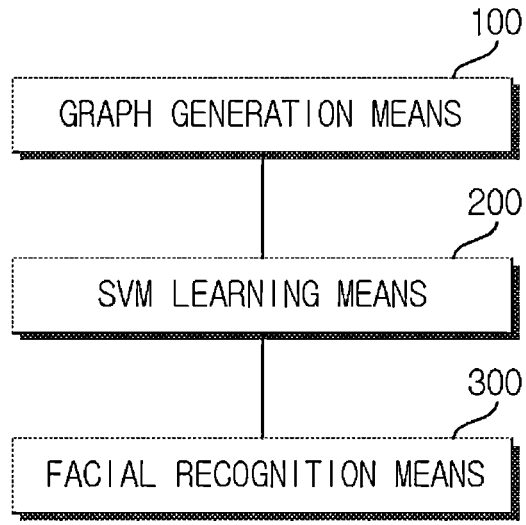
FIG. 1 is a block diagram illustrating a system for recognizing a disguised face according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a system and a method for recognizing a disguised face using a Gabor feature and a support vector machine (SVM) classifier according to exemplary embodiments of the present invention will be described with reference to FIGS. 1 through 9. A detailed description will be made based on a portion required to understand an operation and a function according to the present invention. Like reference numerals refer to like constituent elements through the present specification, even though they are illustrated in different drawings. When it is determined the detailed description related to a related known function or configuration may make the purpose of the present invention unnecessarily ambiguous in describing the present invention, the detailed description will be omitted here.

In particular, the present invention proposes a new facial recognition method capable of recognizing a face of a person who is disguised with a mask, a sunglasses, and the like, by estimating a position of a facial feature point from a facial image, by extracting a Gabor feature value from the estimated facial feature point, and by recognizing a face using the extracted Gabor feature value as an input vector of the SVM classifier FIG. 1 is a block diagram illustrating a system for recognizing a disguised face according to an exemplary embodiment of the present invention.

As shown in FIG. 1, the system for recognizing the disguised face according to the present invention may include a graph generation means 100, an SVM learning means 200, a facial recognition means 300, and the like.

The graph generation means 100 may generate a standard face graph from facial image samples capable of expressing various faces such as a male, a female, a gender, and the like, which will be described in detail with reference to FIG. 2.

Figure 2:
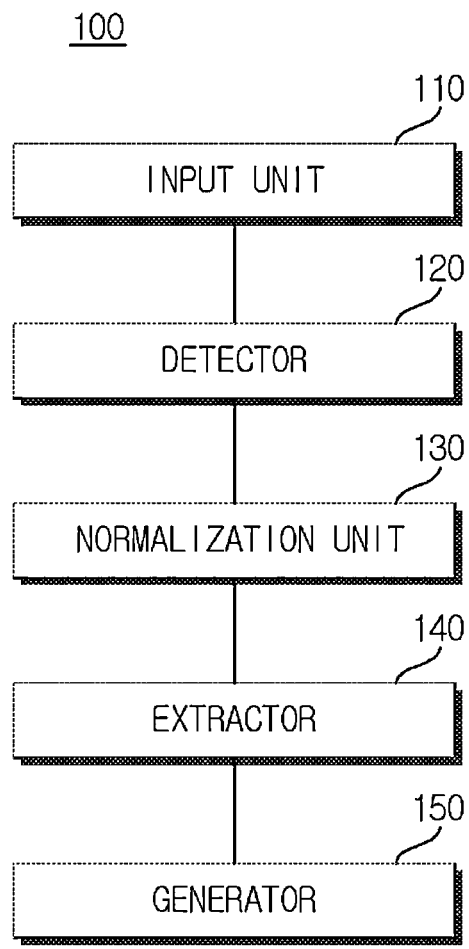
FIG. 2 is a block diagram illustrating a detailed configuration of a graph generation means of FIG. 1.

FIG. 2 is a block diagram illustrating a detailed configuration of the graph generation means 100 of FIG. 1.

As shown in FIG. 2, the graph generation means 100 according to the present invention may include an input unit 110, a detector 120, a normalization unit 130, an extractor 140, a generator 150, and the like.

The input unit 110 may receive facial image samples having various facial shapes.

The detector 120 may detect a rectangular facial area with a predetermined size of n×n from each of the input facial image samples using an Adaboost algorithm. In particular, the detector 120 may train the Adaboost algorithm to be in a four-stage cascaded structure using a modified census transform (MCT) scheme that is obtained by enhancing a Viola-Jones algorithm.

Here, when the detector 120 does not detect the facial area of the (n×n) size, the detector 120 may detect the facial area while gradually reducing the size of the input facial image sample. A size of window in which the facial area is to be detected is fixed to n×n. Therefore, in order to find various sizes of a face that may appear in an image, a face may be found using the window for each step while gradually decreasing a size of an original image. As a result, regardless of a size of a face occupying in an image, it is possible to perform detection of the facial area.

The normalization unit 130 may normalize each of the detected rectangular facial areas to a predetermined (m×m) size. Here, a value of m may be set to be greater than or equal to a value of n. That is, since the size of the facial image detected in the input image is not consistent, there is a desire for a normalization process for making the size of the detected facial image consistent in order to increase the efficiency of feature detection.

The extractor 140 may extract a facial feature point from each of the normalized rectangular facial areas. For example, the extractor 140 may extract a total of 38 facial feature points by extracting points 1 to 9 associated with both eyes and eyebrows, points 10 to 13 associated with a nose, points 14 to 18 associated with lips, points 19 to 21 associated with a jaw, and points 22 to 30 associated with a facial outline, and by additionally extracting eight points through performing interpolation between the extracted facial feature points.

The generator 150 may generate a standard face graph using the extracted facial feature points.

Figure 3:
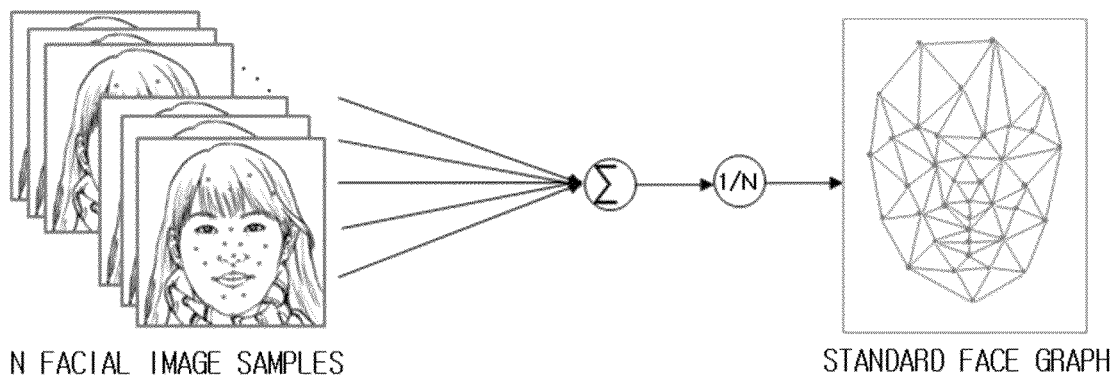
FIG. 3 is a diagram to describe a principle of generating a standard face graph according to an exemplary embodiment of the present invention.

FIG. 3 is a diagram to describe a principle of generating a standard face graph according to an exemplary embodiment of the present invention.

As shown in FIG. 3, the generator 150 may obtain a position value of each feature point and a Gabor feature value with respect to each of facial feature points extracted from N facial image samples, add up the obtained position values of feature points and Gabor feature values and then obtain the average position value and the average Gabor feature value by dividing the addition value by N that is the number of facial images and generate a standard face graph using the obtained average position value and average Gabor feature value.

The reason of applying the average values by averaging the position values of facial feature points and the Gabor feature values is to extract a feature point of a face normalized with respect to various facial shapes.

The SVM learning means 200 may determine an optimal classification plane for recognizing a disguised face from facial image samples and disguised facial image samples, which will be described in detail with reference to FIG. 3.

Figure 4:
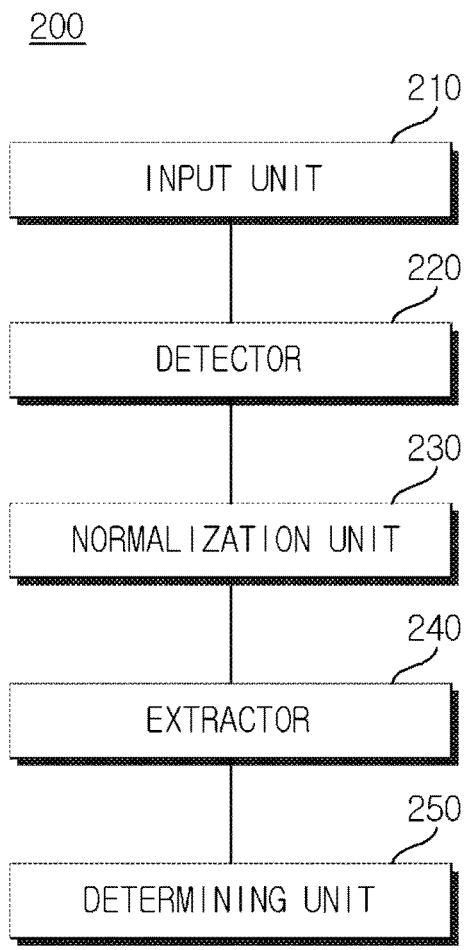
FIG. 4 is a block diagram illustrating a detailed configuration of a support vector machine (SVM) learning means of FIG. 1.

FIG. 4 is a block diagram illustrating a detailed configuration of the SVM learning means 200 of FIG. 1.

As shown in FIG. 4, the SVM learning means 200 according to the present invention may include an input unit 210, a detector 220, a normalization unit 230, an extractor 240, a determining unit 250, and the like.

The input unit 210 may receive facial image samples and disguised facial image samples.

The detector 220 may detect a rectangular facial area from each of the input facial image samples and the disguised facial image samples using an Adaboost algorithm.

Figure 5:
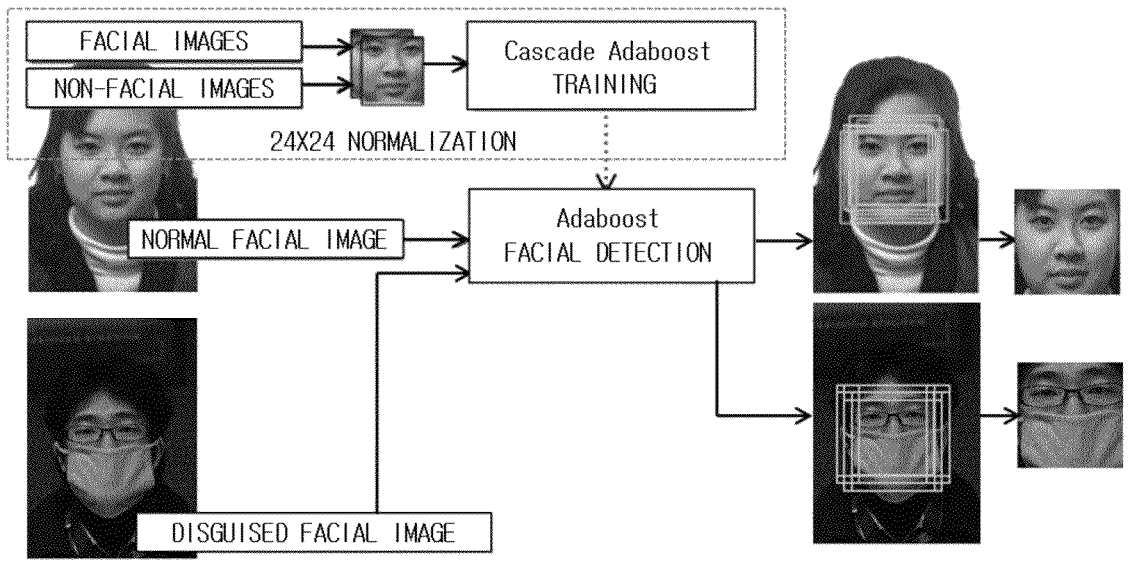
FIG. 5 is a diagram to describe a principle of detecting a facial area according to an exemplary embodiment of the present invention.

FIG. 5 is a diagram to describe a principle of detecting a facial area according to an exemplary embodiment of the present invention.

As shown in FIG. 5, the detector 220 may detect a plurality of facial areas with a predetermined (n×n) size from input facial image samples and disguised facial image samples using an Adaboost algorithm, and average coordinate values of the plurality of detected facial areas and thereby detect a facial area having the average coordinate value.

Here, when the detector 120 does not detect the facial area of the predetermined (n×n) size, the detector 120 may detect the facial area while gradually reducing the size of the input facial image sample.

The detected facial area may be used as initial matching information of an optimal face graph.

The normalization unit 230 may normalize each of the detected rectangular facial areas to a predetermined (m×m) size. Here, a value of m may be set to be greater than or equal to a value of n.

The extractor 240 may generate the optimal face graph using the normalized rectangular facial area and may extract a Gabor feature value and a position value from the generated optimal face graph.

Figure 6:
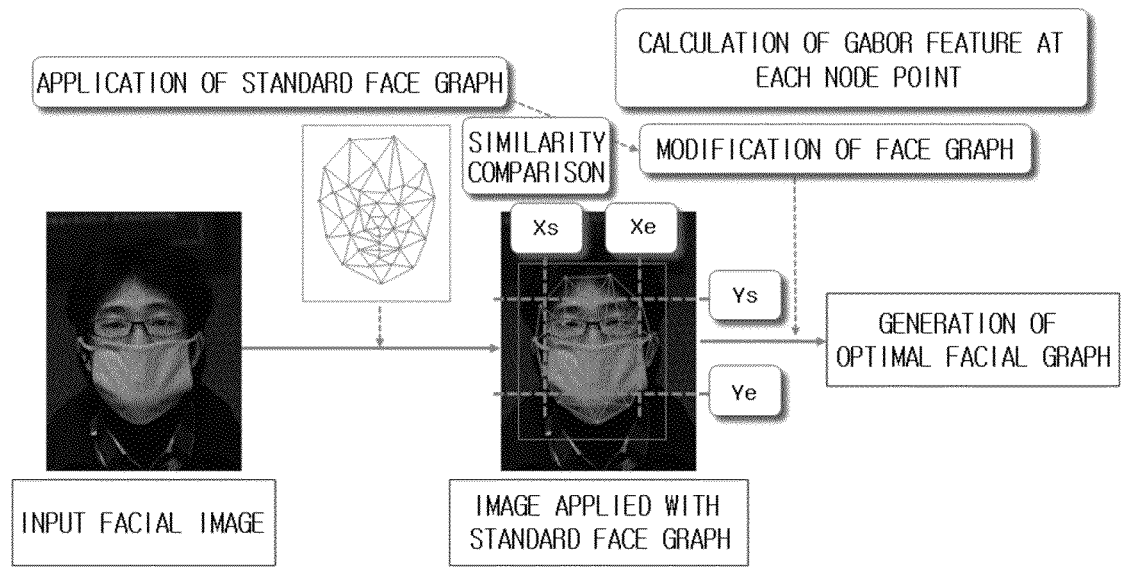
FIG. 6 is a diagram to describe a principle of generating an optimal face graph according to an exemplary embodiment of the present invention.

FIG. 6 is a diagram to describe a principle of generating an optimal face graph according to an exemplary embodiment of the present invention.

As shown in FIG. 6, the extractor 240 adjusts a size of a standard face graph based on position points of both eyes within a rectangular facial area and thereby overlaps the size-adjusted standard face graph and a facial image sample as an initial face graph. This is to adjust the size of the standard face graph to fit a size of a facial area.

A detailed description relating thereto will be made as follows. That is, the extractor 240 adjusts the standard face graph based on position points of both eyes. In this instance, for example, the extractor 240 generates an initial face graph by adjusting the size of the standard face graph so that an upper feature point of an eye brow may be positioned on an upper Ys of a rectangle, an interpolation point between a lip and a jaw may be positioned on a lower Ye of the rectangle, and both jaw-line points of the face may be positioned on left Xs and Xe of the rectangle based on the position points of both eyes.

The extractor 240 may generate an optimal face graph by obtaining a Gabor feature value from each node of the initial face graph, by comparing a similarity between the obtained Gabor feature value and a standard Gabor feature value obtained from each node of the standard face graph, and by repeatedly modifying the initial face graph using a partial swarm optimization (PSO) algorithm based on the comparison result.

The PSO algorithm is an evolutionary calculation method and used to obtain an optimal solution from a complex function. The PSO algorithm obtains the optimal solution by exchanging information with a personal particle and a particle within a swarm.

For example, when variable parameters of a face graph are defined as a D-dimensional search space, and when it is assumed that a position of an I-th personal particle is indicated as a D-dimensional vector $X_i=(x_{i1}, x_{i2}, \ldots, x_{iD})^T$ and a movement speed of particle that is a position change amount between a current position and a subsequent position of the face graph including the above particles is indicated as a D-dimensional vector $V_i=(v_{i1}, v_{i2}, \ldots, v_{iD})^T$, a previous position and a current position of a particle are compared with respect to each particle within a swarm and an optimal position is calculated based on the comparison result. Next, a speed and a position of a personal particle are updated as shown in the following Equation 1.

$$V_i^{n+1} = \omega V_i^n + c_1 rand_1(P_{i\_best} - X_i^n) + c_2 rand_2(G_{best} - X_i^n)$$
$$X_i^{n+1} = X_i^n + V_i^{n+i}, i=1,2,\ldots,N \quad \text{[Equation 1]}$$

Here, $p_{i\_best}$ denotes a best previously visit position of a personal particle, and $g_{best}$ denotes a global best visit position among all the particles. w denotes an initial weight, each of $c_1$ and $c_2$ denotes constant as an acceleration coefficient, and each of $rand_1$ and $rand_2$ denotes a random number having an equivalent distribution value between [0,1].

A best previously visit position of an i-th personal particle may be expressed as $P_{i\_best}=(p_{i1}, p_{i2}, \ldots, p_{iD})^T$, and $g_{best}$ may be expressed as a global best visit position $G_{best}=(g_1, g_2, \ldots, g_D)^T$ of a particle g having the optimal solution among all the particles within a swarm.

Here, variable parameters may include a center between both eyes, a size scaling parameter of the entire graph, an upper size scaling parameter of both eyes, a lower size scaling parameter of both eyes, and the like.

The determining unit 250 may determine the optimal classification plane for recognizing the disguised face using the extracted Gabor feature value and the position value of each of nodes of the optimal face graph.

Figure 7:
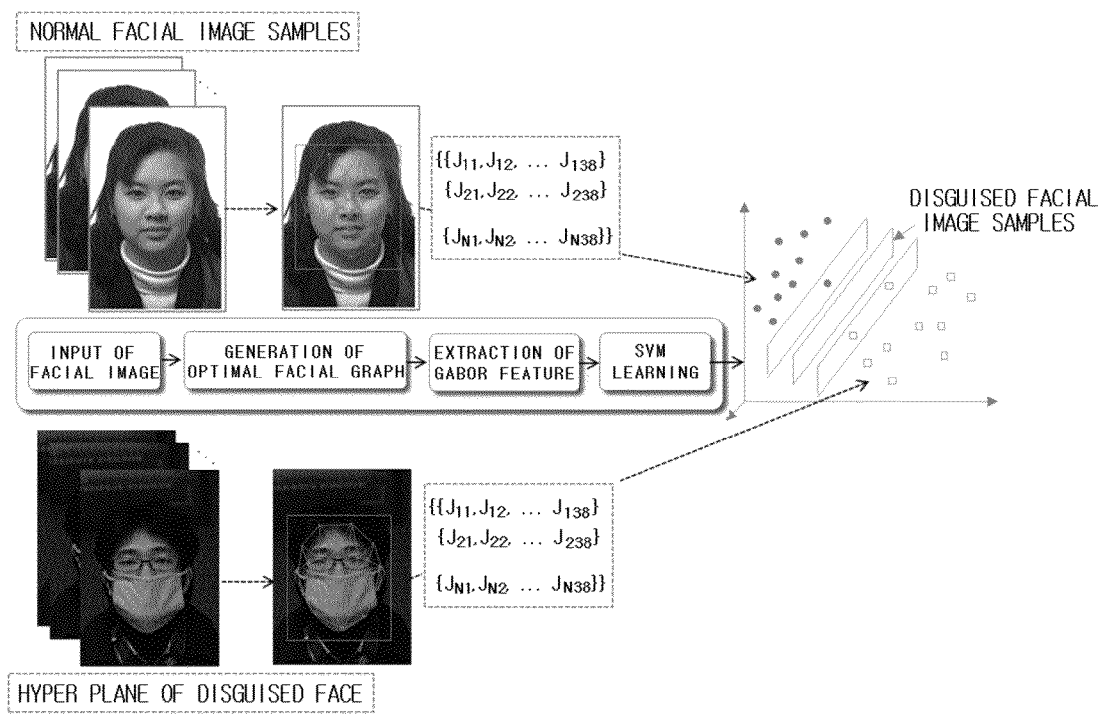
FIG. 7 is a diagram to describe a principle of obtaining an optimal classification plane according to an exemplary embodiment of the present invention.

FIG. 7 is a diagram to describe a principle of obtaining an optimal classification plane according to an exemplary embodiment of the present invention.

As shown in FIG. 7, the determining unit 250 may provide a Gabor z-value and a position value of each of nodes of an optimal face graph as an input value of an SVM classifier and as a result, determine the optimal classification plane.

Here, the SVM classifier is a classifier model configured to enable a globally optimal identification by mapping a feature vector to a high dimension feature space. The SVM classifier is basically known as a classifier model capable of best classifying two classes and is a statistical learning model of maximizing a classification capability by setting an optimal hyperplane capable of optimally separating feature data of two classes. However, it is difficult to completely separate, using a linear hyperplane, feature data extracted from various shapes of input images such as a facial image or a disguised facial image. Therefore, the linear hyperplane may be expanded to be linearly separable as shown in the figure by mapping data to a high dimension space using a kernel function. As described above, a normal facial feature vector and a disguised facial feature vector are data of which linear separation is difficult. Therefore, by providing, as an input of the SVM classifier, a feature vector that is generated by mapping feature data to a high dimension space, the classification capability may be maximized.

A high dimension Gabor feature vector used in the present invention extracts 40 types of Gabor feature values, that is, 1520-dimensional feature vectors with respect to each of 38 node points and provides the extracted feature vectors as an input vector of the SVM classifier. As the SVM learning result, facial image data that is difficult to be classified in a low dimension was able to be accurately classified into two classes, that is, a normal face and a disguised face in 1520-dimensional space. The proposed disguised face recognition method may discriminate a normal face and a face that is disguised with sunglasses or a mask while maximizing the classification capability and without increasing a memory size or decreasing a processing rate.

The facial recognition means 300 may recognize a disguised face from an input facial image using the standard face graph and the optimal classification plane, which will be described with reference to FIG. 8.

Figure 8:
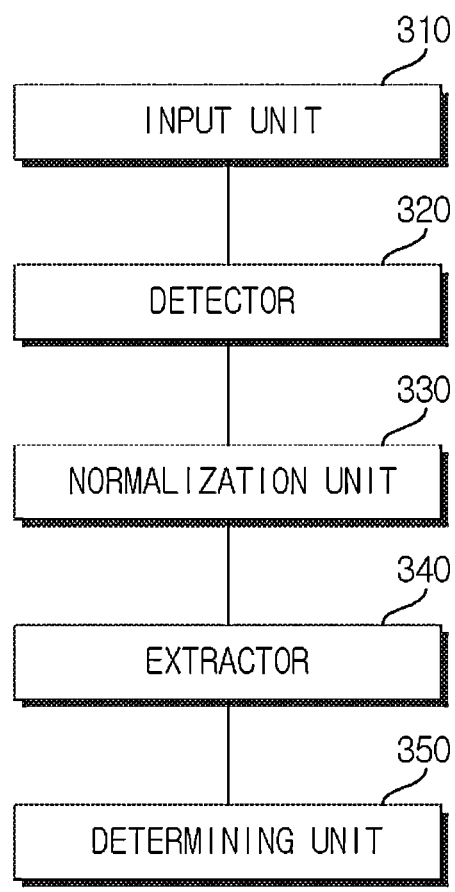
FIG. 8 is a block diagram illustrating a detailed configuration of a facial recognition means of FIG. 1.

FIG. 8 is a block diagram illustrating a detailed configuration of the facial recognition means 300 of FIG. 1.

As shown in FIG. 8, the facial recognition means 300 according to the present invention may include an input unit 310, a detector 320, a normalization unit 330, an extractor 340, a determining unit 350, and the like.

The input unit 310 may receive a facial image for determining whether the facial image is disguised.

The detector 320 may detect a rectangular facial area from the input facial image using an Adaboost algorithm.

That is, the detector 320 may detect a plurality of facial areas with a predetermined (n×n) size from the input facial image using the Adaboost algorithm, average coordinate values of the plurality of detected facial areas, and as a result, detect a facial area having the average coordinate value.

The normalization unit 330 may normalize each of the detected rectangular facial areas to a predetermined (m×m) size. Here, a value of m may be set to be greater than or equal to a value of n.

The extractor 340 may generate an optimal face graph using the normalized rectangular facial area and extract a Gabor feature value and a position value from the generated optimal face graph.

A detailed description relating thereto will be made as follows. That is, the extractor 340 adjusts a size of a standard face graph based on position points of both eyes within the rectangular facial area and thereby overlaps the size-adjusted standard face graph and a facial image sample as an initial face graph.

The extractor 340 may generate an optimal face graph by obtaining a Gabor feature value from each node of the initial face graph, by comparing a similarity between the obtained Gabor feature value and a standard Gabor feature value obtained from each node of the standard face graph, and by modifying the initial face graph using a PSO algorithm based on the comparison result.

The extractor 340 may extract a Gabor feature value and a position value of each of nodes of the optimal face graph.

The determining unit 350 may provide the extracted Gabor feature value and position value of each of nodes of the optimal face graph as an input value of the SVM classifier and as a result, may obtain an output value of the SVM classifier, and may determine whether the input facial image is a normal facial image or a facial image disguised with a mask or sunglasses using the obtained output value and a pre-generated optimal classification plane.

Figure 9:
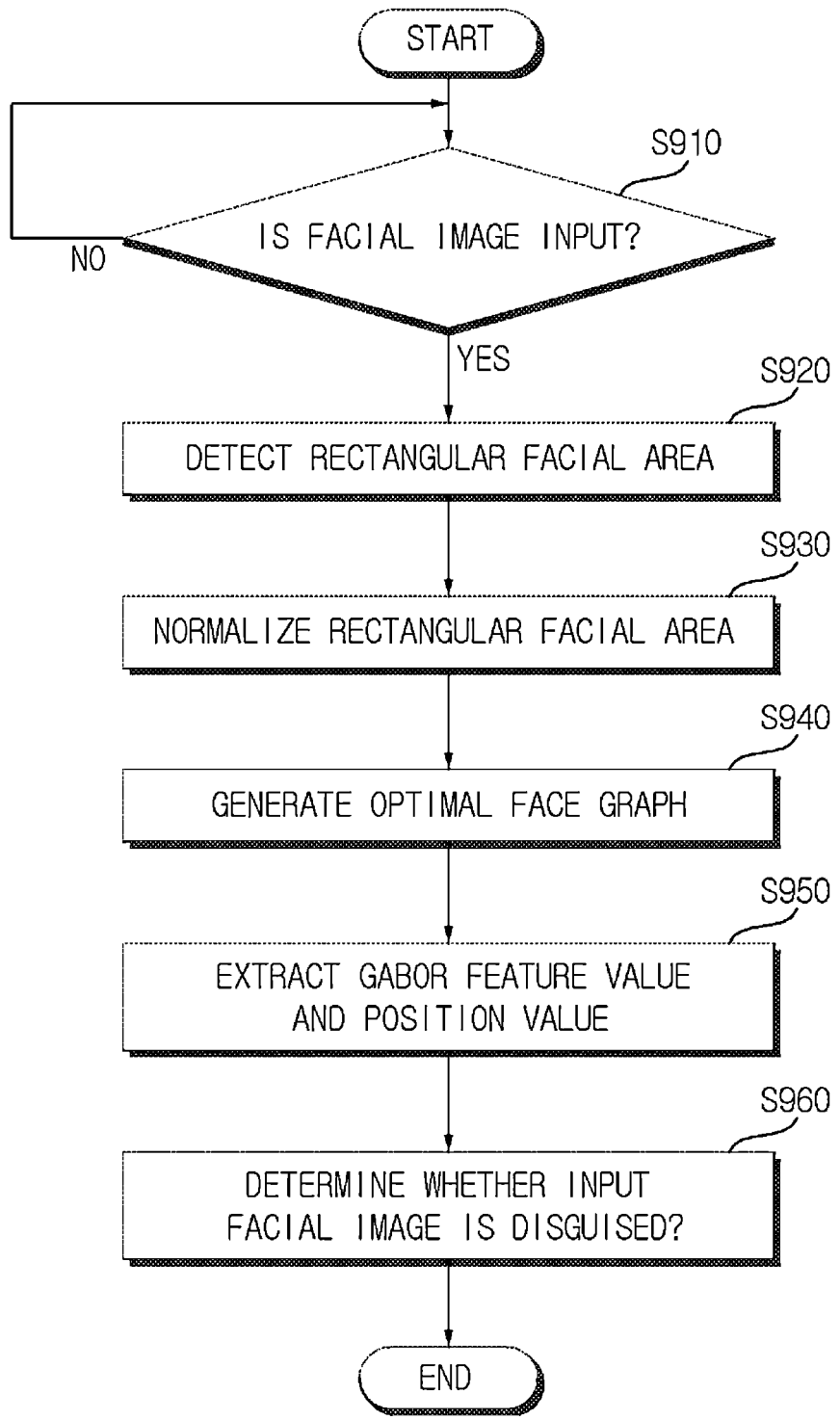
FIG. 9 is a flowchart illustrating a method of recognizing a disguised face according to an exemplary embodiment of the present invention.

FIG. 9 is a flowchart illustrating a method of recognizing a disguised face according to an exemplary embodiment of the present invention.

As shown in FIG. 9, when a system (hereinafter, referred to as a disguised face recognition system) for recognizing a disguised face according to the present invention receives a facial image (S910), the disguised face recognition system may detect a rectangular facial area from the input facial image using an Adaboost algorithm (S920).

Next, the disguised face recognition system may normalize the detected rectangular facial area to a predetermined size (S930).

Next, the disguised face recognition system may generate an optimal face graph using the normalized rectangular facial area (S940) and may extract a Gabor feature value and a position value from the generated optimal face graph (S950).

Next, the disguised face recognition system may provide, as an input value of an SVM classifier, the extracted Gabor feature value and position value of each of nodes of the optimal face graph and as a result, obtain an output value of the SVM classifier.

Next, the disguised face recognition system may determine whether an input facial image sample is disguised using the obtained output value and a pre-generated optimal classification plane (S960).

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, a system and a method for recognizing a disguised face using a Gabor feature and an SVM classifier according to the exemplary embodiments of the present invention have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for recognizing a disguised face, the system comprising:
    a graph generation means configured to generate a single standard face graph from a plurality of facial image samples;
    a support vector machine (SVM) learning means configured to determine an optimal classification plane for discriminating a disguised face from the plurality of facial image samples and disguised facial image samples,
    wherein the SVM learning means generates an initial face graph by adjusting a size of the single standard face graph based on position points of both eyes within a rectangular facial area,
    and generates an optimal face graph by comparing a similarity between a Gabor feature value at each node of the initial face graph and a standard Gabor feature value at the each node of the single standard face graph and repeatedly modifying the initial face graph using a particle swarm optimization (PSO) algorithm based on a result of the comparison;
    wherein the PSO algorithm is an evolutionary calculation used to obtain an optimal solution from a complex function by exchanging information with a personal particle and a particle within a swarm, using variable parameters such as a center between both eyes, a size scaling parameter of the entire single standard face graph, an upper size scaling parameter of the both eyes, or a lower size scaling parameter of the both eyes; and
    wherein the personal particle is a first data point from the single standard face graph, and the particle within the swarm is a second data point from the swarm, and the swarm is a collection of data points;
    a facial recognition means configured to determine whether an input facial image is disguised using the standard face graph and the optimal classification plane, when the facial image to be recognized is input.

2. The system of claim 1, wherein the graph generation means detects the rectangular facial area with a predetermined size from each of the input facial image samples using an Adaboost algorithm, normalizes each of the detected rectangular facial areas to a predetermined size, extracts a facial feature point from each of the normalized rectangular facial areas, and generates the standard face graph using the extracted facial feature points.

3. The system of claim 2, wherein the size of the normalized rectangular facial area is set to be greater than or equal to a size of the detected rectangular facial area, and a detector detects the rectangular facial area while gradually reducing a size of the input facial image sample.

4. The system of claim 1, wherein the SVM learning means detects a rectangular facial area from each of the input facial image samples and the disguised facial image samples using an Adaboost algorithm, normalizes each of the detected rectangular facial areas to a predetermined size, generates the optimal face graph using the normalized rectangular facial areas, extracts the Gabor feature value from the generated optimal face graph, and determines the optimal classification plane for discriminating the disguised face using
    the extracted Gabor feature value of the optimal face graph and a position value.

5. The system of claim 1, wherein the facial recognition means detects the rectangular facial area from the input facial image using an Adaboost algorithm, normalizes the detected rectangular facial area to a predetermined size, generates the optimal face graph using the normalized rectangular facial area, and determines whether the input facial image is disguised using the Gabor feature value and the position value that are extracted from the generated optimal face graph, and the generated optimal classification plane.

6. The system of claim 5, wherein the facial recognition means generates the optimal face graph using the normalized rectangular facial area, extracts the Gabor feature value and the position value from the generated optimal face graph, and provides the extracted Gabor feature value and position value of each of nodes of the optimal face graph as an input value of an SVM classifier and as a result, obtains an output value of the SVM classifier, and determines whether the input facial image is disguised using the output value and the generated optimal classification plane.

7. A system for recognizing a disguised face, the system comprising:
    a detector configured to detect a rectangular facial area from an input facial image using an Adaboost algorithm;
    a normalization unit configured to normalize the detected rectangular facial area to a predetermined size;
    an extractor configured to generate an optimal face graph using the normalized rectangular facial area, and to extract a Gabor feature value and a position value from the generated optimal face graph,
    wherein the generating an optimal face graph includes comparing a similarity between the Gabor feature value at each node of the initial face graph and a standard Gabor feature value at the each node of the standard face graph and repeatedly modifying the initial face graph using a particle swarm optimization (PSO) algorithm based on a result of the comparison, and
    wherein the PSO algorithm is an evolutionary calculation used to obtain an optimal solution from a complex function by exchanging information with a personal particle and a particle within a swarm, using variable parameters such as a center between both eyes, a size scaling parameter of the entire graph, an upper size scaling parameter of the both eyes, or a lower size scaling parameter of the both eyes; and wherein the personal particle is a first data point from the single standard face graph, and the particle within the swarm is a second data point from the swarm, and the swarm is a collection of data points; and a determining unit configured to determine whether the input facial image is disguised using the extracted Gabor feature value and the position value, and a pre-generated optimal classification plane for recognizing a disguised face, wherein the determining unit determines the input facial image by adjusting a size of the standard face graph based on position points of the both eyes within a the rectangular facial area.

8. The system of claim 7, wherein the determining unit provides the extracted Gabor feature value and the position value of each of nodes of the optimal face graph as an input value of an SVM classifier and as a result, obtains an output value of the SVM classifier, and determines whether the input facial image is disguised using the output value and the optimal classification plane.

9. A method of recognizing a disguised face, the method comprising:
  generating, using a processor, a single standard face graph from a plurality of facial image samples;
  generating, using the processor, an optimal classification plane for recognizing the disguised face from the plurality of facial image samples and disguised facial image samples, wherein the generating of the optimal classification plane generates an initial face graph by adjusting a size of the single standard face graph based on position points of both eyes within a rectangular facial area and generates an optimal face graph by comparing a similarity between a Gabor feature value at each node of the initial face graph and a standard Gabor feature value at the each node of the standard face graph and repeatedly modifying the initial face graph using a particle swarm optimization (PSO) algorithm based on a result of the comparison, and
  wherein the PSO algorithm is an evolutionary calculation used to obtain an optimal solution from a complex function by exchanging information with a personal particle and a particle within a swarm, using variable parameters such as a center between both eyes, a size scaling parameter of the entire graph, an upper size scaling parameter of the both eyes, or a lower size scaling parameter of the both eyes; and wherein the personal particle is a first data point from the single standard face graph, and the particle within the swarm is a second data point from the swarm, and the swarm is a collection of data points;
  determining, using the processor, whether an input facial image is disguised using the standard face graph and the optimal classification plane, when the facial image to be recognized is input.

10. The method of claim 9, wherein the generating of the standard face graph detects the rectangular facial area with a predetermined size from each of the input facial image samples using an Adaboost algorithm, normalizes each of the detected rectangular facial areas to a predetermined size, extracts a facial feature point from each of the normalized rectangular facial areas, and generates the standard face graph using the extracted facial feature points.

11. The method of claim 10, wherein the size of the normalized rectangular facial area is set to be greater than or equal to a size of the detected rectangular facial area.

12. The method of claim 9, wherein the generating of the optimal classification plane detects a rectangular facial area from each of the input facial image samples and the disguised facial image samples using an Adaboost algorithm, normalizes each of the detected rectangular facial areas to a predetermined size, generates an optimal face graph using the normalized rectangular facial areas, extracts a Gabor feature value from the generated optimal face graph, and generates the optimal classification plane for discriminating the disguised face using the extracted Gabor feature value of the optimal face graph and a position value.

13. The method of claim 9, wherein the determining of whether the input facial image is disguised detects a rectangular facial area from the input facial image using an Adaboost algorithm, normalizes the detected rectangular facial area to a predetermined size, generates an optimal face graph using the normalized rectangular facial area, and determines whether the input facial image is disguised using a Gabor feature value and a position value that are extracted from the generated optimal face graph, and the generated optimal classification plane.

14. The method of claim 13, wherein the determining of whether the input facial image is disguised generates the optimal face graph using the normalized rectangular facial area, extracts the Gabor feature value and the position value from the generated optimal face graph, and provides the extracted Gabor feature value and position value of each of nodes of the optimal face graph as an input value of an SVM classifier and as a result, obtains an output value of the SVM classifier, and determines whether the input facial image is disguised using the output value and the generated optimal classification plane.

15. A method of recognizing a disguised face, the method comprising:
  detecting a rectangular facial area from an input facial image using an Adaboost algorithm;
  normalizing the detected rectangular facial area to a predetermined size;
  generating an optimal face graph using the normalized rectangular facial area, and extracting a Gabor feature value and a position value from the generated optimal face graph; and
  determining whether the input facial image is disguised using the extracted Gabor feature value and the position value, and a pre-generated optimal classification plane for recognizing the disguised face, wherein generating includes generating an initial face graph by adjusting a size of a standard face graph based on position points of both eyes within the rectangular facial area, and generates an the optimal face graph by comparing a similarity between the Gabor feature value at each node of the initial face graph and a standard Gabor feature value at the each node of the standard face graph and repeatedly modifying the initial face graph using a particle swarm optimization (PSO) algorithm based on a result of the comparison,
  wherein the PSO algorithm is an evolutionary calculation used to obtain an optimal solution from a complex function by exchanging information with a personal particle and a particle within a swarm, using variable parameters such as a center between both eyes, a size scaling parameter of the entire graph, an upper size scaling parameter of the both eyes, or a lower size scaling parameter of the both eyes and
  wherein the personal particle is a first data point from the single standard face graph, and the particle within the swarm is a second data point from the swarm, and the swarm is a collection of data points.

16. The method of claim 15, wherein the determining of whether the input facial image is disguised provides the extracted Gabor feature value and position value of each of nodes of the optimal face graph as an input value of an SVM classifier and as a result, obtains an output value of the SVM classifier, and determines whether the input facial image is disguised using the output value and the optimal classification plane.

* * * * *